Figure 14:
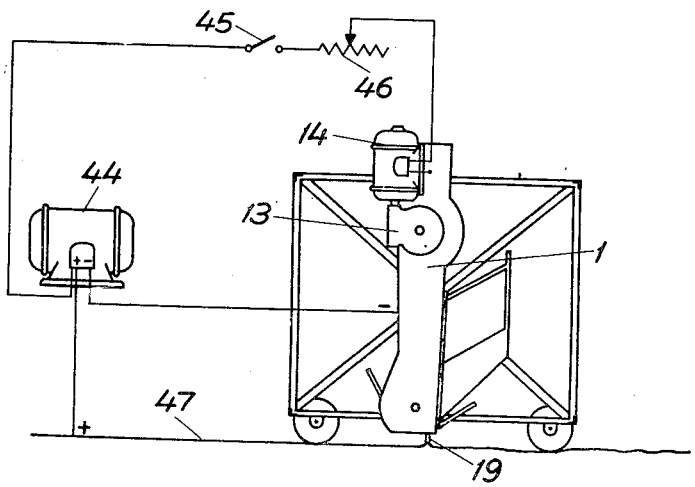

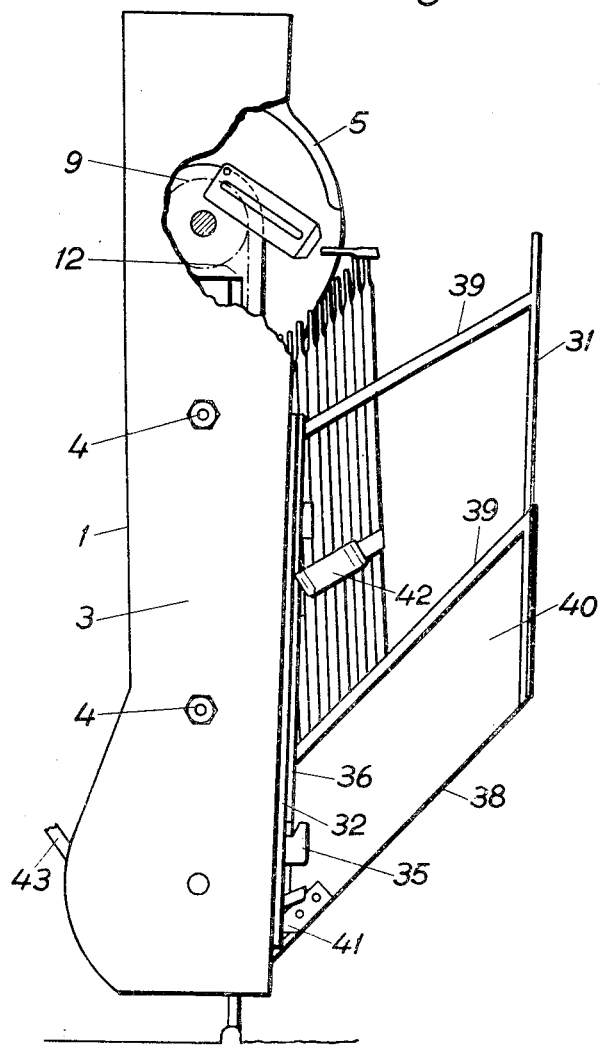

April 18, 1950  S. LUNDAHL ET AL  2,504,711
AUTOMATIC ARC WELDING MACHINE
Filed Feb. 18, 1947  9 Sheets-Sheet 2
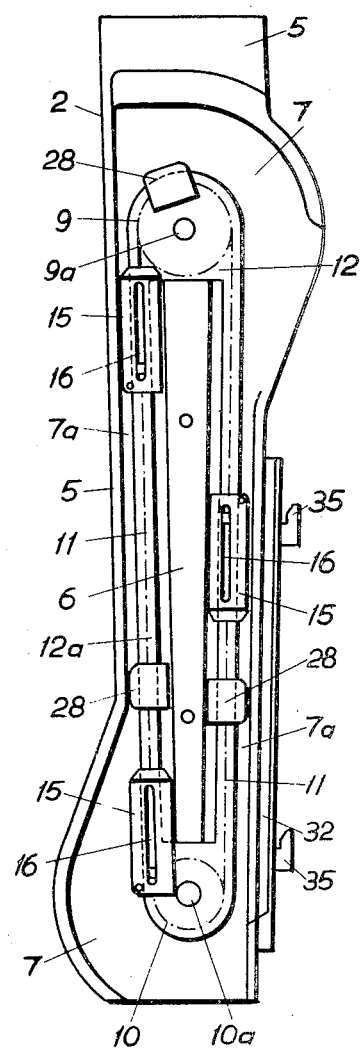
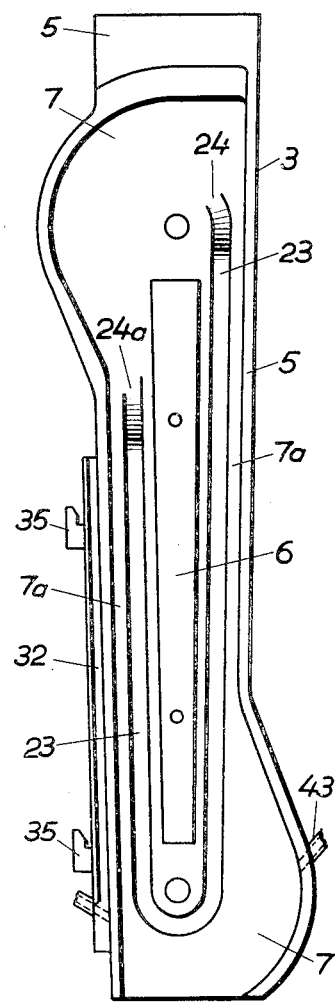
Inventors
Carl Lundahl and
Sven Lundahl
By [signature]
Attorney

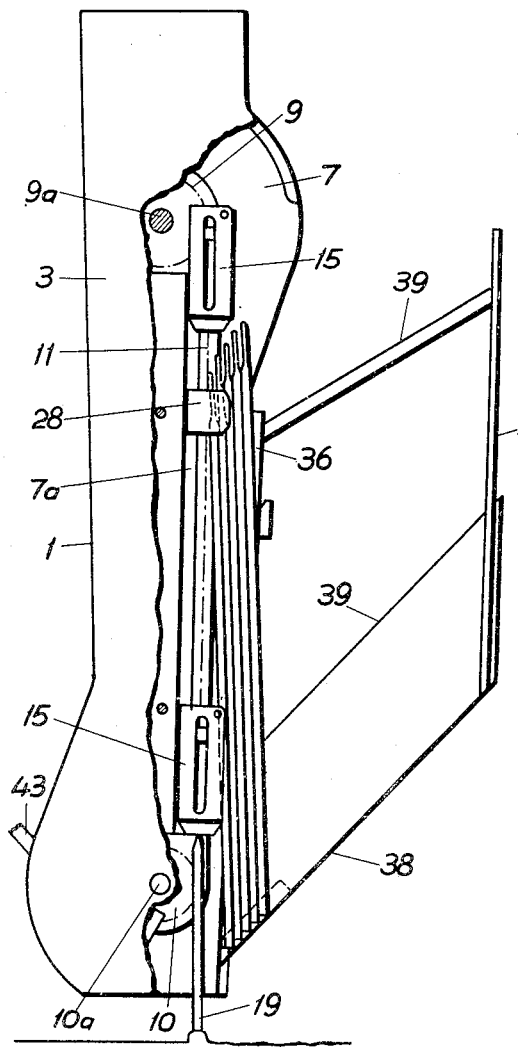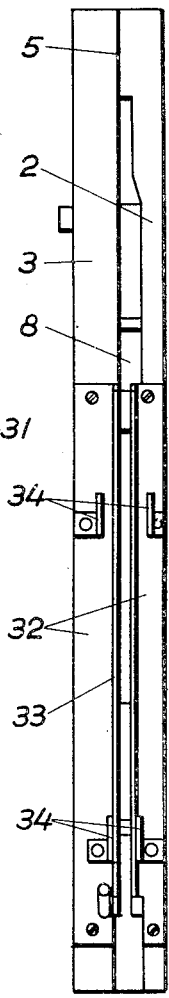

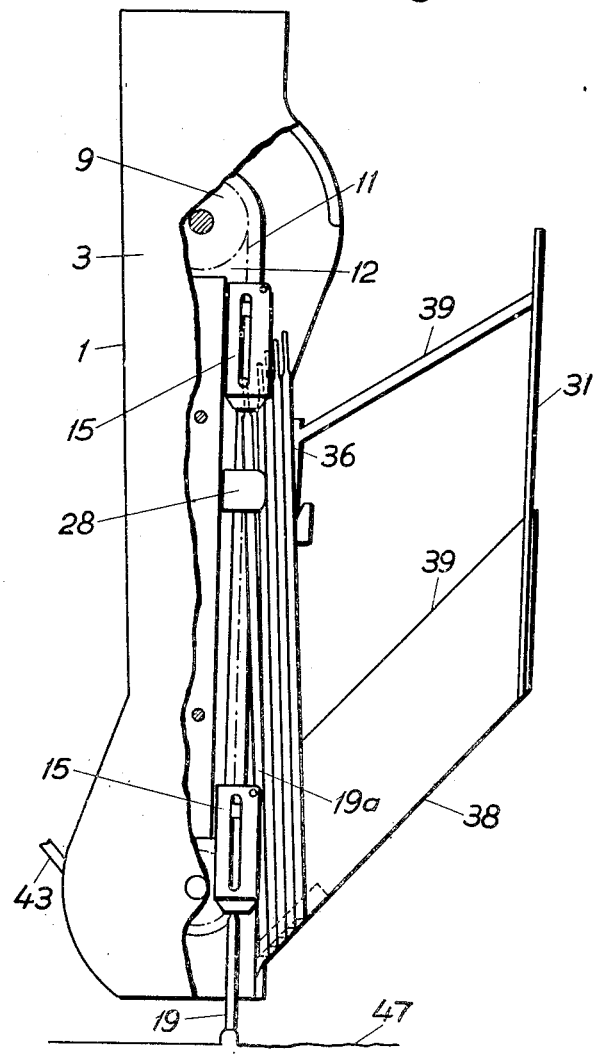

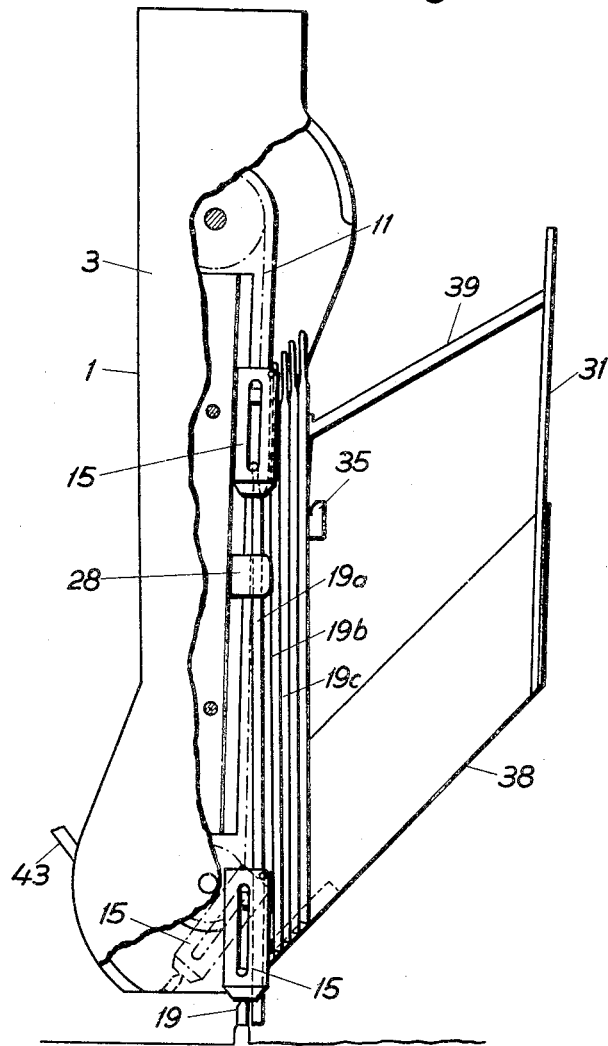

April 18, 1950
S. LUNDAHL ET AL
2,504,711
AUTOMATIC ARC WELDING MACHINE
Filed Feb. 18, 1947
9 Sheets-Sheet 6
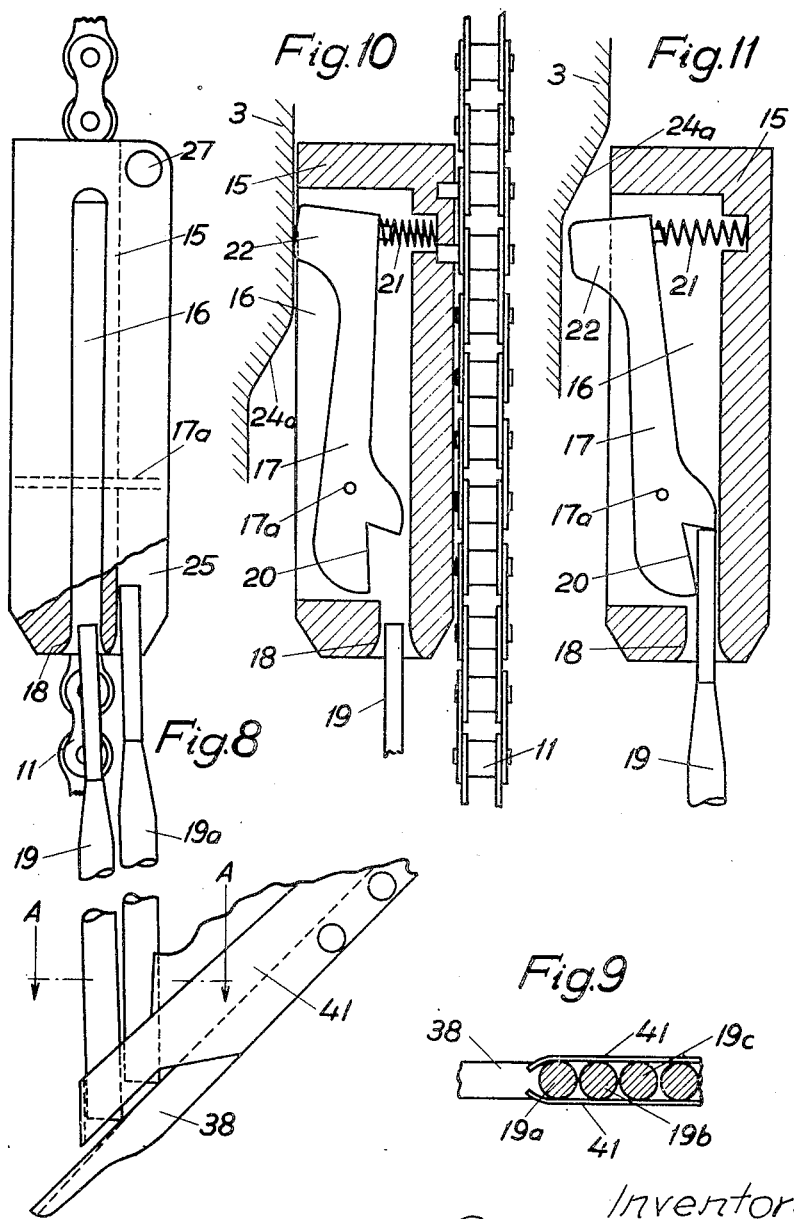
Inventors
Carl Lundahl and
Sven Lundahl
By [signature]
Attorney.

April 18, 1950  S. LUNDAHL ET AL  2,504,711
AUTOMATIC ARC WELDING MACHINE
Filed Feb. 18, 1947  9 Sheets-Sheet 7

Inventors
Carl Lundahl and
Sven Lundahl
By [signature]
Attorney.

April 18, 1950     S. LUNDAHL ET AL     2,504,711
AUTOMATIC ARC WELDING MACHINE
Filed Feb. 18, 1947     9 Sheets-Sheet 8
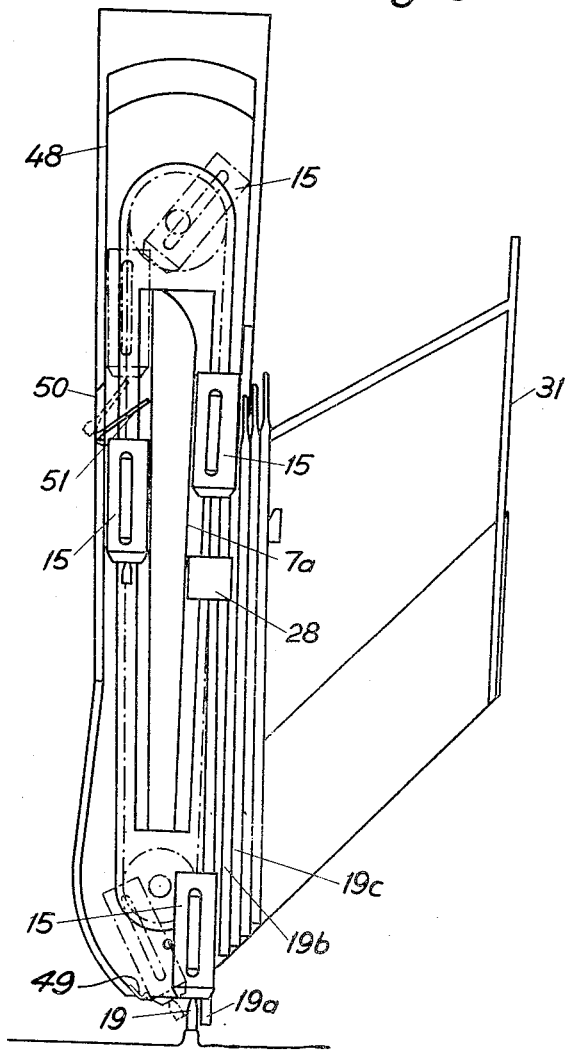

April 18, 1950   S. LUNDAHL ET AL   2,504,711
AUTOMATIC ARC WELDING MACHINE
Filed Feb. 18, 1947   9 Sheets-Sheet 9

Inventor
Carl Lundahl and
Sven Lundahl
By
Attorney.

Patented Apr. 18, 1950

2,504,711

UNITED STATES PATENT OFFICE 2,504,711

AUTOMATIC ARC WELDING MACHINE

Sven Lundahl and Carl Lundahl, Malmo, Sweden, assignors to Allmänna Svenska Elektriska Aktiebolaget, Västerås, Sweden, a Swedish corporation Application February 18, 1947, Serial No. 729,368
In Sweden February 15, 1946

9 Claims. (Cl. 219—8)

The present invention has for its object an automatic arc welding machine, i. e. a machine, by means of which long welding joints can be made in continuous process without interruptions for changing electrodes, and in which, when it once has been set for a certain welding voltage and thus for a welding arc length, it will automatically regulate the electrode in relation to the work piece, so that the arc length is maintained. During recent years the demand for such an automatic arc welding machine has been very pronounced, especially in the ship building industry, where, to an increased extent, all-welded ship hulls are now being built. Such machines which are reliable under the conditions of practical works and especially of shipyards, have not, however, been heretofore available. Arc welding machines, having means for automatically regulating the length of the arc, are already known, but the problem of reliably substituting a new electrode for a consumed electrode has not heretofore been solved.

By the present invention the latter problem, however, has received a satisfactory solution in that an automatic arc welding machine with above mentioned features has been created, which further is of a very simple but reliable construction and has a very low weight in comparison with other machines that have been intended for the same purpose but have proved impractical under working conditions. The arc welding machine according to the invention is in the first place characterized in that it consists of a welding head, in which two, three or more electrode holders are movably arranged between a rear turning point and a fore point in the neighbourhood of the welding point, and by an electrode magazine arranged in connection with the welding head, which is so arranged that the electrodes one by one, can be transmitted over the welding head and there be caught by one of the said holders on its way from the rear to the fore turning point.

Figure 12:
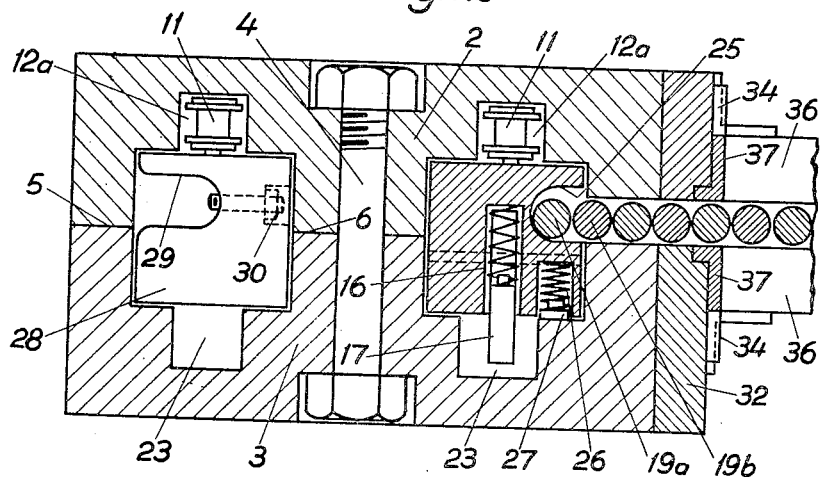
Figure 15:
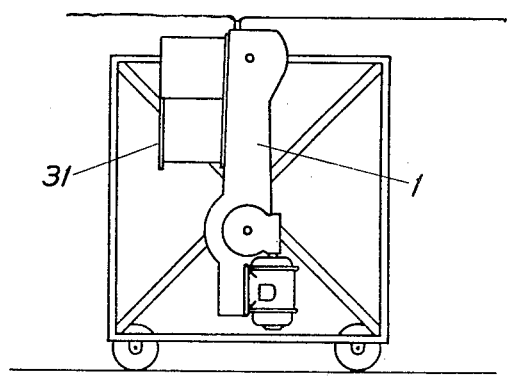
Figure 16:
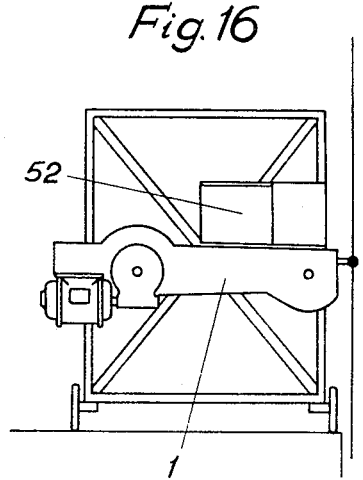

Referring to the accompanying drawings, which show the arc welding machine according to the invention, Fig. 1 is a side vertical view partly in section of a welding head belonging to the machine and also with an electrode magazine. Figs. 2 and 3 show in vertical side view the insides of the two halves forming the casing for the movable parts of the welding head. Fig. 4 is a vertical view corresponding to Fig. 1 but showing the inner of a welding head casing partly opened to the lower end. Fig. 5 is a vertical view of the welding head seen from the right side of Fig. 4 and without the electrode magazine. Fig. 6 is a vertical view corresponding to Fig. 4 but showing another stage of the electrode feeding. Fig. 7 is also a vertical view corresponding to Figs. 4 and 6 but showing a still further stage of the electrode feeding. Fig. 8 is a side view on a larger scale of an electrode feeding piston together with a part of the electrode magazine. Fig. 9 is a section along the line A—A in Fig. 8. Fig. 10 is a vertical section through the electrode feeding piston perpendicular to Fig. 8 in a position where it is not holding any electrode. Fig. 11 is a similar section through the piston of Fig. 10 but in another position, where an electrode is gripped by it. Fig. 12 is a cross section through the welding head with an electrode feeding piston and also with an electrode guiding member. Fig. 13 shows one half of the welding head casing according to another form. Fig. 14 shows schematically but in a smaller scale than Fig. 1 the welding head together with an electric motor for the electrode feeding arranged on a truck for welding downwards on a horizontal surface, which figure also indicates the current circuit from the welding generator. Fig. 15 shows the welding head with the motor arranged in an opposite position on the truck for welding upwards on a horizontal surface. Fig. 16 shows the welding head with the motor arranged on the truck for welding from the side on a vertical surface.

The arc welding machine according to the invention consists of a welding head (Fig. 1), which is intended to be mounted on a truck of some suitable kind as schematically indicated in Figs. 14–16 for different welding positions. The welding head 1 consists of one extended casing consisting of two halves 2 and 3, arranged side-by-side and which casing contains the movable parts of the welding head. The two halves of the casing are suitably cast from some light metal, for instance Silumin, in the form shown in Figs. 2, 3 and 5 and held together by means of two bolts 4 (Fig. 1), the said halves being in contact with each other, partly along surfaces 5 along parts near to the circumference of the head and partly along contact surfaces 6 (see Figs. 2, 3 and 12), which extend in the lengthwise direction of the welding head in the middle part of the halves 2 and 3 so that the welding head casing will form an endless channel 7 containing two straight parts 7a parallel to each other. Along one edge of the welding head the contact surfaces 5 are interrupted, so that there remains a slot 8 (Fig. 5) in the casing for the introduction of electrodes into the channel 7 as hereinafter described. At the lower end the casing is open for the exit of the electrode in operation.

In the welding head 1, in the part of the endless channel 7, which connects the two straight parts 7a, and where the channel thus turns, there is a chain wheel 9 and 10 respectively, attached to a shaft 9a and 10a respectively, which shafts are journalled in the two halves or side parts 2 and 3 of the casing. The chain wheels are arranged in recesses 12 in the part 2 of the casing. The upper chain wheel 9 has a somewhat larger number of teeth than the lower wheel 10. Over the chain wheels 9 and 10 there is an endless chain 11, which runs over a recess 12a, especially provided for the purpose in the part 2 of the casing extending along the parts 7a of the endless channel 7. Due to the different magnitude of the chain wheels, the two parts of the endless chain will converge somewhat in the downward direction, and the straight parts 7a of the channel 7 also converge in the same direction. The shaft of one of the chain wheels and suitably of the upper one is, by a suitable reducing gear, which is schematically indicated at 13 in Fig. 14, coupled together with an electric driving motor 14, which is directly coupled to the said gear and drives the chain 11 in clockwise direction as seen from Fig. 2.

The chain 11 carries three electrode holders or pistons 15, which are made from copper blocks and have a rectangular and suitably square cross section, which fits in the main cross section of the straight parts 7a of the channel 7. Each piston is attached on the side of one of the links 11 of the chain at the end of the piston, which is the uppermost during its motion downwards (to the right in Fig. 2). The pistons 15 are in other respects made as shown in Figs. 8, 10 and 11. They have a longitudinal narrow slot or space 16, which is open at the side turned away from the chain 11, and which contains a locking and ejecting lever 17 for the electrode, which lever is mounted on a pivot 17a journalled in the piston. In the lower end of each piston (at the downward motion, i. e. to the right in Fig. 2) there is an opening 18, through which the end of an electrode 19 (Figs. 8, 10 and 11) can be moved into the slot 16 in coaction with the lever 17. The latter has at its lower end an angular recess 20, one edge thereof as in Fig. 11 holding the end of the electrode 19 forced against the bottom of the slot 16, due to the action of a helical spring 21, which is arranged in the upper part of the slot 16 and tends to force the upper end of the lever 17 outwards. The other edge of the angular recess 20 is in contact with the upper end of the electrode 19 (see Fig. 11) and serves to eject the end of the consumed electrode, when the lever 17 is swung in a clockwise direction (as seen in Figs. 10 and 11). This swinging motion is automatically effected once for each circulation of the pistons in the endless channel 7 since the swinging lever at its upper end has a part 22 projecting from the slot 16 as shown in Figs. 10 and 11, which part, on the straight parts 7a of the channel 7, runs freely in a special recess 23 in the part 3 of the casing, but is brought in contact with the inside of the part 3 of the casing at the upper end of the straight part 7a to the right in Fig. 3, due to the fact that the recess 23 ends with a bevelled surface 24, against which the part 22 slides, causing the lever 17 to swing to the position shown in Fig. 10. The lever will be free to swing back, when the piston passes another bevelled surface 24a, by which the recess 23 commences to the left in Fig. 3. Each piston 15 has further on the outer side a lengthwise groove 25, which serves for guiding a new electrode 19a, which is ready to be introduced into the succeeding piston as shown for instance by Figs. 7 and 8. In a recess in each piston there is a helical spring 26, which carries a sliding contact 27 forced against the wall of the channel 7 for conducting the current from the conducting casing of the welding head 1 to the piston and the electrode.

In addition to the pistons 15 the chain 11 also carries three electrode guiding members 28, which are attached each on a link of the chain at equal distances before the electrode pistons counted in the direction of the motion. These guiding members have the same cross section as the pistons 15 and thus fit the main cross section of the channel 7 as seen for instance from Figs. 2 and 12. On the outer side each guiding member 28 has a groove 29 (Fig. 12), in which the electrode 19 held by the succeeding piston 15 rests and also the following electrode 19a, which as described above is guided in the groove 25 of the said piston 15 to some extent, which is seen from for instance at Fig. 7. The effective depth of the groove 29 can be regulated by means of a screw 30, which from a recess opposite to the groove can be screwed more or less into the bottom of the groove (see Fig. 12).

The welding head 1 carries on one edge at the slot 8 an electrode magazine 31. For attaching the magazine, fittings 32 are attached on the adjacent longitudinal edges of the casing parts 2, 3, being a slot between the two fittings, which forms a continuation of the slot 8, said fittings on the outside close to the slot having a shoulder or ridge 33 intended to fit corresponding ridges on the magazine in order to hold it in the right position. For this purpose also there are members 34, which are fastened on the fittings 32 and are provided with hooks 35 for supporting the magazine. The latter is designed as a frame containing a number of rods arranged in pairs and spaced from each other to provide a space between the rods having a width equal to the diameter of the electrode. The magazine has a vertical side or edge 36 constituted by two rods, which are provided with the said ridges 37 fitting the fittings 32 and a bottom bar 38 forming an oblique angle with the rods 36 and serving as support for a number of electrodes 19a, 19b, 19c, etc., arranged vertically side by side in the space between the two rods 39. The lower part of the magazine between the lower pair of rods 39 and the bottom rod 38 is on both sides covered with sheets 40. The foremost lower end of the magazine, which is shown in Fig. 8, is provided with an electrode conductor consisting of two leaf springs 41, which are attached on each side of the bottom rod 38 and which are bent in against each other over the bottom rod 38 near its foremost end as seen from Fig. 9, said springs serving as a stop for the lower end of the foremost electrode 19a. The electrodes in the magazine are pressed in the direction against the welding head by a suitable arrangement, which as indicated in Fig. 1, can consist of a strip 42 at one end attached on one side of the welding head 1 and at the other end fastened and rolled up in a spring-operated box attached on the other side of the welding head (not shown). The strip is led around the outermost electrode as shown in Fig. 1 and rolled up in the box a little for each new electrode delivered from the magazine. Instead of the strip a spring-operated lever with a roll at the end may be used for feeding the electrodes into the welding head.

By a connection 43 (Fig. 1) for connecting a pipe, compressed air may be delivered into the lower part of the casing 2, 3 for preventing welding particles from entering through the lower opening in the casing.

The electrical coupling of the arc welding machine according to the invention is described briefly with reference to Fig. 14. The + pole of a D. C. generator 44 for generating the common low voltage direct current is connected on one hand over a switch 45 and a regulating resistance 46 with one terminal of the D. C. series motor 14 and on the other hand with the work piece 47. The — pole is connected with the other terminal of the motor 14 and with the casing 2, 3 of the welding head, which as above described is in conducting connection with the electrode 19. The arc circuit is thus coupled in parallel with the motor 14.

The action of the arc welding machine is as follows. It is assumed that one electrode 19 is in working position in the welding head 1 as shown in different stages of consumption in Figs. 4, 6 and 7. When the series motor runs, it drives the chain 11 and the electrode pistons 15 attached on it continuously round in a clockwise direction with a speed, which by means of the gear 13 is reduced to about two or three revolutions per minute. The electrode piston 15 carrying the electrode in action moves slowly downwards in the straight part 7a of the channel 7 to the right in Fig. 2 with a uniform speed, which can be set for instance at the beginning of the welding by means of the regulating resistance 46 in order to correspond to the different working conditions and thus pushes the electrode downwards. If for instance a comparatively rapid feeding of the electrode with corresponding short arc length and rapid melting of the electrode is desired, it is only necessary to increase the voltage on the motor. If at any time during the welding operation the welding current is increased, for instance thereby that the distance between the electrode and the work piece, i. e. the arc length on some place should be lower than on other places, this means that the voltage over the parallel-connected circuits is decreased. As a consequence the speed of the motor and thus of the movable parts of the welding head will be decreased, so that the arc length again is increased. For a decrease of the welding current again the feeding speed is increased. The welding machine will thus automatically tend to maintain a constant arc corresponding to a given setting of the resistance 46.

During the motion of the chain 11 and the pistons 15 the succeeding electrode 19a is held against the lowermost piston 15 and the succeeding guiding member 28 so much inclined that its upper ends will be pushed in through the opening 18 in the succeeding piston 15, when it has moved sufficiently downwards as seen from Figs. 6, 7 and 8, the lower end of the electrode still being held by the springs 41 in the magazine. At a continued motion of this piston it will press the electrode 19a so that it leaves the spring 41 and enters the channel 7a. The locking lever 17 in the piston will simultaneously slide on the bevelled surface 24a and be swung so that it jams the electrode (Fig. 11). When the piston 15 carrying the electrode 19 has reached its lowermost position (Fig. 7) the lower end of the new electrode 19a will be close to the end of the electrode 19, and when the piston turns as shown by dotted lines in Fig. 7 the electrode 19a immediately can overtake the arc. The welding will thus continue without interruptions, as long as the magazine 31 contains electrodes, because these are moved one by one into the welding head from the side and then are fed downwards against the work piece as above described. The end of the electrode 19 will follow its piston on the way upwards, until the piston passes the bevelled surface 24, which as previously described causes such a swinging of the lever 17 that the electrode is liberated and can be ejected from the piston and fall out, when this has passed its upper end position and before it again reaches the bevelled surface 24a.

Instead of guiding the upper end of the electrode by a guiding member 28 attached to the chain as shown on the drawings the electrode may be guided at its upper end by a stationary fork-shaped member, having substantially the same shape as the member 28, and which is moved to the side by a member attached to the chain so far in advance of the electrode holder that the fork-shaped member leaves the upper end just before it has entered the opening in it or the electrode itself may move the member to the side. This fork-shaped member can be given a variable inclined position in relation to the electrode according to different diameters of electrodes used so that for different diameters of the electrodes the electrode is so guided that its upper end is adjusted to take the right position with respect to the opening in the piston 15.

A modified form of the welding head is shown in Fig. 13. The casing, of which only one half 48 is shown, which corresponds to 2 in Figs. 1–7, is practically unchanged but the pistons 15, which in their construction are similar to the piston shown in Figs. 10 and 11, are not rigidly attached to the links of the chain 11 at two points as in the embodiments according to Figs. 1 to 7, shown diagrammatically at the upper part of Fig. 10, but are freely pivoted at only one of said points. In its lower reversing position each of the pistons thus will not swing, as shown by the dot-and-dash lines in Fig. 7, but will be maintained in its vertical position by gravity or in a preferred embodiment shown in Fig. 13 the piston will be held inclined a short time upon the beginning of its upward motion by sliding over a yielding member, such as the spring 49, mounted at the lower opening of the casing so that the end of the electrode remains directed against the welding point when the holder passes beyond its lowest position. As the holder reaches a certain height shown by dot-and-dash lines in Fig. 13, it leaves the yieldable member 49 to swing back into its vertical position by gravity. In a corresponding way the pistons will of course not be swung in the upper (rear) turning position, but in opposition to Fig. 1 will maintain their vertical position. The casing 48 will not as the casing 2, 3 in Figs. 1–7 have any projecting part on its right side, because the pistons here do not require any additional space for the swinging so that the side edge of the casing is straight and will extend so near the path of the pistons that each piston, due to the inertia will have a tendency to take an inclined position and will by striking against the wall of the casing as shown in Fig. 13 be forced back to its right vertical position and enter the straight part 7a of the channel.

The casing 48 has at the left edge in Fig. 13 an opening 50 for the ejection of the electrode end, which end is ejected from each piston, when it passes the not shown bevelled surface which corresponds to 24a in Fig. 3. At the lower edge of the opening 50 is a pivoted flap 51, which flap is under the influence of a not shown spring, which holds the flap in the inwardly inclined position shown on the drawing, said flap closing the channel 7a and forming a bevelled surface, catching the downwardly falling electrode ends and conducting them through the opening 50. When a piston 15 is on way upwards through the channel 7a it will temporarily move the flap to the side.

In horizontal welding on a vertical surface, when the welding head thus takes a horizontal position, the welding electrode end cannot fall out by itself from the holder, but in this case suitably two spring-actuated flaps are arranged, which, after the electrode holder has passed, are forced against each other on opposite sides of the electrode end, so that this is kept and thus drawn out from the holder, when this continues its motion. The electrode end afterwards is put away from the flaps by a following electrode holder and falls down through an opening in the casing of the welding head.

The feeding of the electrode, 19, 19a, etc., is accurately performed from the magazine 31 in the same way as described with the first described form.

In the description above it is assumed that the welding head 1 is vertically arranged for welding downwards. It can, however, also be arranged in the opposite position for welding upwards as shown in Fig. 15 or horizontally for welding on vertical surfaces as shown in Fig. 16. In the former case the electrode magazine 31 ought to be arranged on the welding head in the opposite position so that the electrodes still slide along the bottom rod 38 at the feeding into the welding head. In the latter case a modified magazine 52 is used, in which the electrodes in horizontal position are fed into the welding head 1.

In the described forms of the arc welding machine three electrodes 15 are used. This number is for this type of machine a minimum, but the number may if desirable be more than three.

The described chain driving mechanism 9, 10, 11 may be replaced by a reciprocating mechanism, for instance consisting of two parallel racks, which engage a tooth wheel in two diametrically opposite points, said wheel being arranged on the shaft 9a instead of the chain wheel so that one rack will move upwards simultaneously as the other moves downwards, on which rack is attached an electrode piston or a similar electrode holder, and the number of pistons will in this case be only two. On the other hand two electrode magazines are necessary, one for each rack or piston.

The invention is not limited to the welding machine, welding head, welding magazine and its parts described or indicated above, because these may be modified in different respects within the scope of the invention. So it is for instance unnecessary that the endless channel in the welding head has two straight parts, because it is sufficient if the part, along which the electrode pistons move from its upper or rear turning position to its lower or fore turning position is straight, whereas the way for the pistons back may have any desired form.

We claim as our invention:

1. An automatic arc welding machine comprising welding electrodes, a welding head casing, two wheels mounted in spaced relation to each other within said casing, an endless member running over said wheels, electrode holders pivoted on said endless member, an electrode magazine attached to said casing and supplying the electrodes successively to the holders, a guiding member directing into its holder the upper end of the electrode to be used, an inclined surface on said electrode magazine for supporting the lower ends of said electrodes, means holding back the electrodes on said surface until the force exerted on the electrode to be used in the direction against the welding point reaches a predetermined value, and means clamping the upper end of said electrode during its motion against the welding point and during the removal of the electrode end from said point.

2. An automatic arc welding machine according to claim 1, comprising an endless channel in said welding head casing having at least one straight portion serving to guide the electrode holders as they move against the welding point.

3. An automatic arc welding machine according to claim 2, in which the electrode holders are in the form of pistons of rectangular cross-section having openings for the upper ends of the electrodes and sliding in said endless channel, and comprising means pivoting the holders to said endless member, a member guiding the upper end of the electrode to be used in said opening, and a recess in said channel, such recess guiding the endless member and the holders thereupon along the straight part of said channel.

4. An automatic arc welding machine according to claim 1, in which the electrodes in the magazine and the electrodes in the adjacent holder are in parallel relation to each other, and comprising a support for the lower end of the electrodes with an inclined electrode supporting surface at the part closest to the endless member, and spring means preventing slipping of the electrodes upon said inclined surface.

5. An automatic arc welding machine according to claim 1, in which each electrode holder on the side facing the magazine has a recess adapted to receive the electrode to be used and an edge-shaped portion at the lower end of said recess adapted to separate the electrode to be used from the other electrodes, when the holder reaches said electrode.

6. An automatic arc welding machine according to claim 1, in which each holder has a narrow slot in one of its sides, a lever accommodated in said slot, and one end of which is adapted to grip and to release the upper end of the electrode entering the opening in the holder, a cam path formed by a U-shaped groove having beveled ends, and spring means forcing the opposite end of said lever into engagement with said cam path, said lever successively gripping and releasing the electrode.

7. An automatic arc welding machine according to claim 1, comprising a groove extending lengthwise of the holder on the side thereof facing the magazine, to guide the new electrode fed from the magazine.

8. An automatic arc welding machine according to claim 1, comprising a guiding member mounted on the endless member in advance of each holder, and a groove in said guiding member serving to guide each electrode to the succeeding electrode holder.

9. An automatic arc welding machine according to claim 1, comprising means freely pivoting the electrode holders to the endless member, and a yielding member mounted in the opening of the casing, facing the work and adapted to incline the individual electrode holder and electrode in the direction against the welding point, when said holder and electrode pass the position nearest the work.

SVEN LUNDAHL.
CARL LUNDAHL.

REFERENCES CITED

The following references are of record in the file of this patent:

UNITED STATES PATENTS

| Number | Name | Date |
|---|---|---|
| 1,052,425 | Ridings | Feb. 4, 1913 |
| 2,017,509 | Osborne | Oct. 15, 1935 |
| 2,195,962 | Houser et al. | Apr. 2, 1940 |

FOREIGN PATENTS

| Number | Country | Date |
|---|---|---|
| 718,578 | France | Nov. 4, 1931 |
| 226,974 | Switzerland | Aug. 2, 1943 |